(No Model.)

C. W. COOK.
FAN ATTACHMENT FOR SEWING MACHINES.

No. 362,573. Patented May 10, 1887.

WITNESSES:

INVENTOR:
Christian William Cook
By his Attorney.
Henry Connett

UNITED STATES PATENT OFFICE.

CHRISTIAN WILLIAM COOK, OF WEST JORDAN, UTAH TERRITORY.

FAN ATTACHMENT FOR SEWING-MACHINES.

SPECIFICATION forming part of Letters Patent No. 362,573, dated May 10, 1887.

Application filed August 13, 1886. Serial No. 210,781. (No model.)

*To all whom it may concern:*

Be it known that I, CHRISTIAN WILLIAM COOK, a citizen of the United States, and a resident of West Jordan, in the county of Salt Lake and Territory of Utah, have invented certain Improvements in Fan Attachments for Sewing-Machines, of which the following is a specification.

My invention relates to a gearing especially applicable to certain kinds of sewing-machines, and is designed for use in operating a fan which is driven from the needle-operating shaft of the machine. Such fans are well known, and the purpose in all of them is to agitate the air and thus keep the operator cool. In some cases the fan-shaft is rotatively mounted in a bracket, clamped removably to the machine-table, and the power is taken from a pulley or sheave clamped removably on the exterior face of the hand-wheel of the machine-head. In many of these sewing-machines the belt drives the bobbin-winder, and in order that, when the belt is utilized for this purpose the stitch-forming mechanism and the feed may not be operated, a clutch device is employed whereby the sheave, over which the belt runs, may be connected to or disconnected from the needle-operating shaft. This device is well known, and will need no description. I will only say that the clutch device or clamp is operated by means of a pin arranged in the axis of the hand-wheel, which pin has a large milled head to be grasped by the thumb and finger, and the clamping is effected by the partial rotation of the said head and pin. My fan-driving pulley is constructed to fit on and is attached removably to this head of the clutch, and is in no other way connected with the hand-wheel. When it is desired to wind the bobbin, the clutch may be readily disengaged without removing or disturbing the fan-driving pulley.

Figure 1:
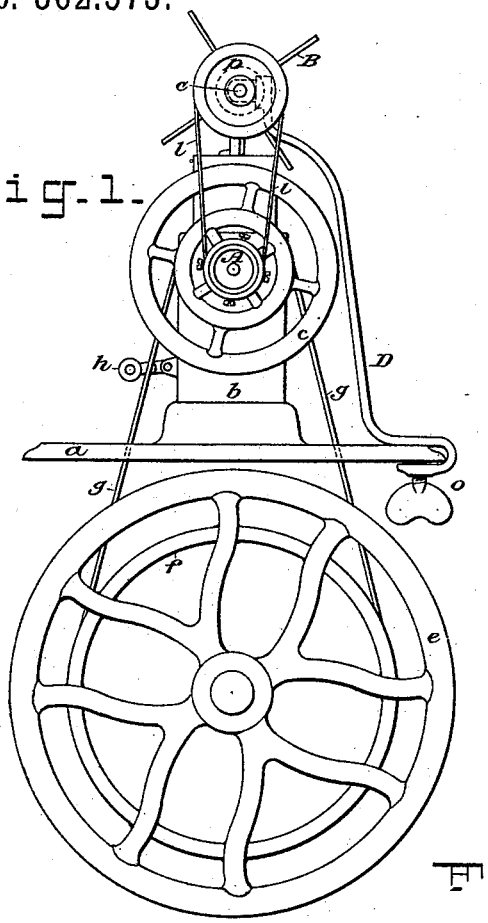
Figure 3:
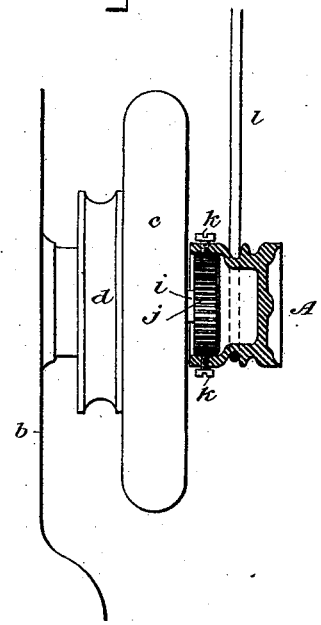
Figure 2:
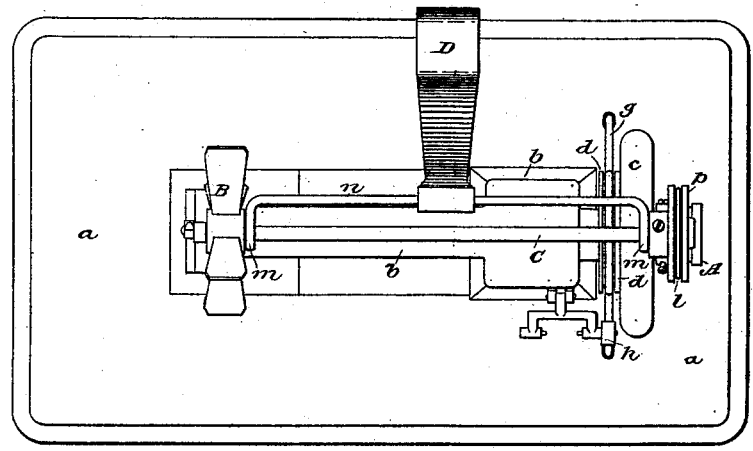

In the drawings, which serve to illustrate my invention, Figure 1 is an end elevation of a sewing-machine provided with my improvements, as much of the machine being shown as is necessary to illustrate the application of my invention thereto. Fig. 2 is a plan of the same. Fig. 3 is an enlarged side view of the hand-wheel of the machine, showing my improved pulley device in section.

Let $a$ represent the table of any sewing-machine of this character, as the "Domestic," for example; $b$, the arm of the machine; $c$, the hand-wheel; $d$, the needle-driving sheave; $e$, the fly-wheel, carrying the main sheave $f$; $g$, the main driving-belt, and $h$ the wheel of the bobbin-winder. All of these are substantially the same on all sewing-machines of this general character. The Domestic, as well as many other machines, is also provided with a clutch device, as before stated, for disengaging the needle-driving sheave $d$ from the needle-operating shaft, which extends through the arm $b$, and is not shown herein. Fig. 3 shows the stem or pin $i$ and milled head $j$ of said clutch device. I do not deem it necessary to show any more than this of said device.

A is my sheave or pulley, which is usually constructed as clearly shown in Fig. 3—that is to say, it is cast hollow, with one open end made to fit over the milled head $j$, and is secured removably thereto or thereon by means of set-screws $k$, or other convenient means of a similar character. In the pulley A may be formed one or more sheave-grooves to receive a round or slender belt, $l$, for driving the fan. I show two grooves in the pulley A, one deeper than the other. This enables two different speeds to be obtained, as in the case of the ordinary cone-pulley. I prefer a grooved pulley and a round or slender belt; but an ordinary pulley-face and a flat belt will serve.

B is the fan, and C its shaft, rotatively mounted in bearings at $m\ m$, Fig. 2, in a bar, $n$, fixed to the upper end of an elastic bracket, D, which is removably clamped to the machine-table $a$ by a screw-clamp, $o$. On the end of the fan-shaft C, over the pulley A, is fixed a sheave or pulley, $p$, and this sheave is connected with or coupled to pulley A by the belt $l$.

The object in making the bracket D of an elastic-metal plate is to preserve a proper tension on the belt $l$, and to enable the said belt to be thrown on and off conveniently, if required. This is a great convenience where grooved sheaves are employed. The elasticity of the bracket D also keeps the belt taut or strained in whichever groove of pulley A it may be placed.

I prefer to arrange the fan, as shown, about over the needle-plate of the machine, so that it will be in front of the operator's face. When mounted on or over the hand-wheel, the fan does not prove effective, as it is too far to one side.

It will readily be seen that when the pulley A is attached to the milled head $j$ of the clutch device the latter device may be readily operated without the necessity of removing said pulley, whereas when the pulley is attached to the hand-wheel so as to cover and embrace the clutch-head the pulley must be removed before the clutch can be operated.

Having thus described my invention, I claim—

1. The combination, with the fan, its shaft, and the pulley on said shaft, of the clutch-head or clamping-head $j$ of a sewing-machine and the pulley A, constructed to fit onto said head and provided with screws for attaching it removably to said head $j$, whereby said clutch may be operated to release the needle-driving sheave without the necessity of removing said pulley.

2. The combination, with the fan, its shaft, and the pulley on said shaft, of the clutch-head or clamp-head $j$ of a sewing-machine, the pulley A, mounted removably on said clutch-head and provided with two grooves of different depths to receive the belt $l$, and the said belt connecting the pulley A with the pulley on the fan-shaft, substantially as described.

3. The combination, with the elastic bracket D and its clamp, of the fan-shaft mounted rotatively in bearings carried by said bracket, the fan and pulley mounted on said fan-shaft, the clutch-head $j$, the pulley A, mounted on said clutch-head, and the belt $l$, connecting said pulley A with the pulley on the fan-shaft, substantially as set forth.

In witness whereof I have hereunto signed my name in the presence of two subscribing witnesses.

CHRISTIAN WILLIAM COOK.

Witnesses:
SAMUEL R. REIST,
ADOLF E. GABHARD.